(12) United States Patent
Wang et al.

(10) Patent No.: US 11,392,002 B2
(45) Date of Patent: Jul. 19, 2022

(54) ARRAY SUBSTRATE, DISPLAY PANEL AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaoyuan Wang, Beijing (CN); Wu Wang, Beijing (CN); Yan Fang, Beijing (CN); Ruilin Bi, Beijing (CN); Yajie Bai, Beijing (CN); Yujie Gao, Beijing (CN); Seungmin Lee, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 82 days.

(21) Appl. No.: 16/629,313

(22) PCT Filed: Aug. 27, 2019

(86) PCT No.: PCT/CN2019/102781
§ 371 (c)(1),
(2) Date: Jan. 7, 2020

(87) PCT Pub. No.: WO2020/082884
PCT Pub. Date: Apr. 30, 2020

(65) Prior Publication Data
US 2021/0223647 A1 Jul. 22, 2021

(30) Foreign Application Priority Data
Oct. 25, 2018 (CN) .......................... 201811255929.3

(51) Int. Cl.
G02F 1/1362 (2006.01)
G02F 1/1368 (2006.01)

(52) U.S. Cl.
CPC ...... G02F 1/136286 (2013.01); G02F 1/1368 (2013.01); G02F 1/136209 (2013.01)

(58) Field of Classification Search
CPC .................................................. G02F 1/136286
See application file for complete search history.

(56) References Cited

U.S. PATENT DOCUMENTS 10,133,122 B2 11/2018 Yang et al.
10,564,490 B2 2/2020 Yuan et al.
(Continued)

FOREIGN PATENT DOCUMENTS

CN 101241278 A 8/2008
CN 102033365 A 4/2011
(Continued)

OTHER PUBLICATIONS

First Chinese Office Action dated Sep. 3, 2020, for corresponding Chinese Application No. 201811255929.3, 16 pages.
(Continued)

*Primary Examiner* — Sang V Nguyen
(74) *Attorney, Agent, or Firm* — Kinney & Lange, P.A.

(57) ABSTRACT

An array substrate includes a base substrate; a data line and a common electrode line on the base substrate; and a first gate line and a second gate line on the base substrate, wherein both the first gate line and the second gate line cross both the data line and the common electrode line to define a sub-pixel. The sub-pixel includes: a pixel electrode; a common electrode; and an insulating layer between the pixel electrode and the common electrode. The common electrode includes a plurality of slits, and the slits extend in the same direction as the data line. The slits include a first slit close (Continued)

to the data line, the pixel electrode includes a first side surface close to the data line, and an orthographic projection of the first side surface on the base substrate is located within an orthographic projection of the first slit on the base substrate.

18 Claims, 14 Drawing Sheets

(56) References Cited

U.S. PATENT DOCUMENTS

| | | | |
|---|---|---|---|
| 10,747,059 B2 | 8/2020 | Yang et al. | |
| 2003/0071931 A1* | 4/2003 | Nakayoshi | G02F 1/1343 |
| | | | 349/39 |
| 2007/0024789 A1 | 2/2007 | Itou et al. | |
| 2008/0186440 A1* | 8/2008 | Lim | G02F 1/134363 |
| | | | 349/141 |
| 2009/0135117 A1* | 5/2009 | Cho | G02F 1/134363 |
| | | | 345/87 |
| 2011/0085121 A1 | 4/2011 | Jeon et al. | |
| 2012/0327352 A1 | 12/2012 | Uyama et al. | |
| 2014/0159086 A1* | 6/2014 | Yu | G02F 1/136209 |
| | | | 257/98 |
| 2016/0013250 A1* | 1/2016 | Kim | G02F 1/136209 |
| | | | 257/40 |
| 2016/0080731 A1* | 3/2016 | Niu | G02F 1/134336 |
| | | | 348/54 |
| 2016/0334680 A1* | 11/2016 | Miyamoto | G02F 1/134363 |
| 2017/0031215 A1 | 2/2017 | Yang et al. | |
| 2017/0102599 A1 | 4/2017 | Niu et al. | |
| 2017/0293188 A1 | 10/2017 | Niu et al. | |
| 2019/0041702 A1 | 2/2019 | Yang et al. | |
| 2019/0051667 A1* | 2/2019 | Cai | H01L 27/127 |
| 2019/0064611 A1* | 2/2019 | Yuan | G02F 1/13439 |
| 2019/0096911 A1* | 3/2019 | Li | G02F 1/136286 |
| 2019/0361301 A1 | 11/2019 | Li et al. | |

FOREIGN PATENT DOCUMENTS

| | | |
|---|---|---|
| CN | 104216129 A | 12/2014 |
| CN | 104793401 A | 7/2015 |
| CN | 104914640 A | 9/2015 |
| CN | 105446030 A | 3/2016 |
| CN | 106383423 A | 2/2017 |
| CN | 106773378 A | 5/2017 |
| CN | 107450239 A | 12/2017 |
| KR | 100862926 B1 | 10/2008 |

OTHER PUBLICATIONS

Second Chinese Office Action dated Mar. 11, 2021, for corresponding Chinese Application No. 201811255929.3, 16 pages.

* cited by examiner

ARRAY SUBSTRATE, DISPLAY PANEL AND DISPLAY DEVICE

CROSS-REFERENCE TO RELATED APPLICATION

This application is a Section 371 National Stage Application of International Application No. PCT/CN2019/102781, filed on Aug. 27, 2019, entitled "ARRAY SUBSTRATE, DISPLAY PANEL AND DISPLAY DEVICE," which claims the benefit of Chinese Patent Application No. 201811255929.3 filed on Oct. 25, 2018, the whole disclosure of which is incorporated herein by reference.

TECHNICAL FIELD

The present disclosure relates to the field of display technology, and in particular, to an array substrate, a display panel, and a display device.

BACKGROUND

At present, thin film transistor liquid crystal displays (abbreviated as TFT-LCD) mainly include twisted nematic (abbreviated as TN) type, in-plane switching (abbreviated as IPS) type and advanced super-dimensional switching (abbreviated as ADS) type. In the ADS TFT-LCD, an electric field is generated at edges of slit electrodes in the same plane and an electric field is generated between a slit electrode layer and a planar electrode layer so as to form a multi-dimensional electric field, so that liquid crystal molecules which are located between the slit electrodes and directly above the electrodes in a liquid crystal cell and are aligned in all directions are rotatable.

However, in current ADS-type displays, an electric field at corners of the slit electrodes is disordered, so that almost all long-side edges of sub-pixels are displayed as dark areas. Therefore, the current ADS-type displays still have a disadvantage of many dark areas, so they are needed to be improved.

SUMMARY

In an aspect, an array substrate is provided, including: a base substrate; a data line and a common electrode line on the base substrate; and a first gate line and a second gate line on the base substrate, both the first gate line and the second gate line being insulated from and crossing both the data line and the common electrode line to define a sub-pixel, wherein the sub-pixel includes: a pixel electrode on the base substrate; a common electrode on a side of the pixel electrode distal to the base substrate; and an insulating layer between the pixel electrode and the common electrode, wherein the common electrode includes a plurality of slits, and the plurality of slits extend in the same direction as the data line.

Optionally, the plurality of slits include a first slit close to the data line, the pixel electrode includes a first side surface close to the data line, and an orthographic projection of the first side surface of the pixel electrode on the base substrate is located within an orthographic projection of the first slit on the base substrate; and/or, the plurality of slits include a second slit close to the common electrode line, the pixel electrode includes a second side surface close to the common electrode line, and an orthographic projection of the second side surface of the pixel electrode on the base substrate is located within an orthographic projection of the second slit on the base substrate.

Optionally, the orthographic projection of the first side surface of the pixel electrode on the base substrate is located at a middle position of the orthographic projection of the first slit on the base substrate in a direction perpendicular to the data line; and/or the orthographic projection of the second side surface of the pixel electrode on the base substrate is located at a middle position of the orthographic projection of the second slit on the base substrate in a direction perpendicular to the common electrode line.

Optionally, the pixel electrode includes a third side surface close to the first gate line, and an orthographic projection of the third side surface of the pixel electrode on the base substrate partially overlaps with orthographic projections of the plurality of slits on the base substrate; and/or the pixel electrode includes a fourth side surface close to the second gate line, and an orthographic projection of the fourth side surface of the pixel electrode on the base substrate partially overlaps with the orthographic projections of the plurality of slits on the base substrate.

Optionally, an orthographic projection of the common electrode on the base substrate at least partially overlaps with an orthographic projection of the common electrode line on the base substrate.

Optionally, the array substrate includes a plurality of the sub-pixels, and the plurality of the sub-pixels include at least two sub-pixels which are located in the same row and on two sides of the common electrode line respectively; and an orthographic projection of any one of common electrodes of the two sub-pixels on the base substrate at least partially overlaps with the orthographic projection of the common electrode line on the base substrate.

Optionally, the array substrate further includes a connection portion for connecting the common electrodes of the two sub-pixels, an orthographic projection of the connection portion on the base substrate at least partially overlaps with the orthographic projection of the common electrode line on the base substrate, and a size of the connection portion in an extension direction of the common electrode line is equal to a size of any one of the common electrodes of the two sub-pixels in the extension direction of the common electrode line.

Optionally, the sub-pixel further includes a light shielding portion, and an orthographic projection of the light shielding portion on the base substrate is located between an orthographic projection of the data line on the base substrate and an orthographic projection of the pixel electrode on the base substrate.

Optionally, the light shielding portion includes a first side surface close to the data line and a second side surface distal to the data line, the data line includes a first side surface close to the light shielding portion, and a distance between an orthographic projection of the first side surface of the light shielding portion on the base substrate and an orthographic projection of the first side surface of the data line on the base substrate is smaller than a distance between an orthographic projection of the second side surface of the light shielding portion on the base substrate and the orthographic projection of the first side surface of the pixel electrode on the base substrate.

Optionally, the orthographic projection of the first side surface of the light shielding portion on the base substrate coincides with the orthographic projection of the first side surface of the data line on the base substrate.

Optionally, the light shielding portion and the pixel electrode are located in the same layer.

Optionally, the orthographic projection of the data line on the base substrate does not overlap with an orthographic projection of the common electrode on the base substrate.

Optionally, the array substrate further includes a thin film transistor including a gate electrode, wherein the light shielding portion and the gate electrode of the thin film transistor are located in the same layer.

Optionally, the data line includes a first data line portion and a second data line portion, and the first data line portion intersects with the second data line portion; one of the slits includes a first slit portion and a second slit portion, and the first slit portion intersects with the second slit portion; and the first data line portion is parallel to the first slit portion, and the second data line portion is parallel to the second slit portion.

Optionally, the array substrate includes a plurality of the sub-pixels; and wherein, among ones of the plurality of the sub-pixels in the same row, the sub-pixels in odd columns are connected to the first gate line, and the sub-pixels in even columns are connected to the second gate line.

Optionally, the pixel electrode is a planar electrode.

Optionally, the data line and the common electrode line are located in the same layer and spaced apart from each other, and the common electrode line is electrically connected to the common electrode through a first conductive plug.

Optionally, the light shielding portion is electrically connected to the common electrode through a second conductive plug.

In another aspect, a display panel is provided, including the array substrate as described above.

In a further aspect, a display device is provided, including the display panel as described above.

BRIEF DESCRIPTION OF THE DRAWINGS

From the following descriptions of the present disclosure with reference to accompanying drawings, other objectives and advantages of the present disclosure will become apparent and they may be helpful for a comprehensive understanding of the present disclosure.

Figure 1:
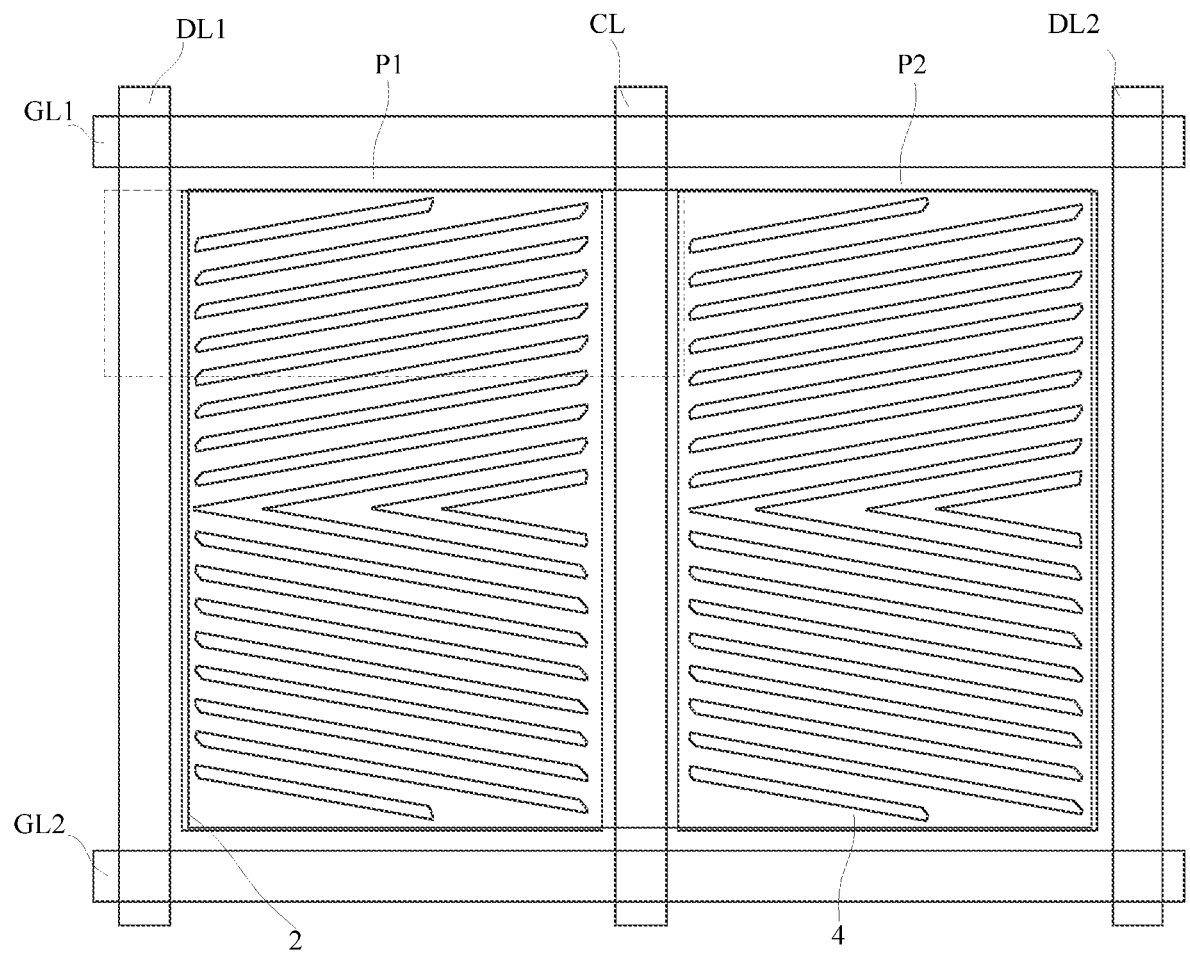
FIG. 1 is a partial plan view of an array substrate according to some embodiments of the present disclosure.

It should be noted that, for the sake of clarity, in the drawings for describing the embodiments of the present disclosure, dimensions of layers, structures, or regions may be enlarged or reduced, that is, these drawings are not drawn to actual scales.

DETAILED DESCRIPTION OF EMBODIMENTS

Technical solutions of the present disclosure will be further specifically described through the embodiments in conjunction with the accompanying drawings. In the specification, the same or similar reference numerals indicate the same or similar components. The following descriptions of the embodiments of the present disclosure with reference to the drawings are intended to explain the general inventive concept of the present disclosure, and should not be construed as a limitation to the present disclosure.

In addition, in the following detailed descriptions, for ease of explanation, many specific details are set forth to provide a comprehensive understanding of the embodiments of the present disclosure. Obviously, however, one or more embodiments may be practiced without these specific details.

It should be noted that the terms "on . . . ", "formed on . . . " and "provided on . . . " described herein may mean that one layer is directly formed or provided on another layer, or a layer is indirectly formed or provided on another layer, that is, there are other layers between the two layers.

It should be noted that, although the terms "first", "second" and the like may be used herein to describe various components, members, elements, regions, layers, and/or parts, these components, members, elements, regions, layers, and/or parts should not be limited by these terms. Rather, these terms are used to distinguish one component, member, element, region, layer, and/or part from another component, member, element, region, layer, and/or part. Thus, for example, a first component, a first component, a first element, a first region, a first layer, and/or a first part discussed below may be referred to as a second component, a second member, a second element, a second region, a second layer, and/or a second part without departing from the teachings of the present disclosure.

Figure 2:
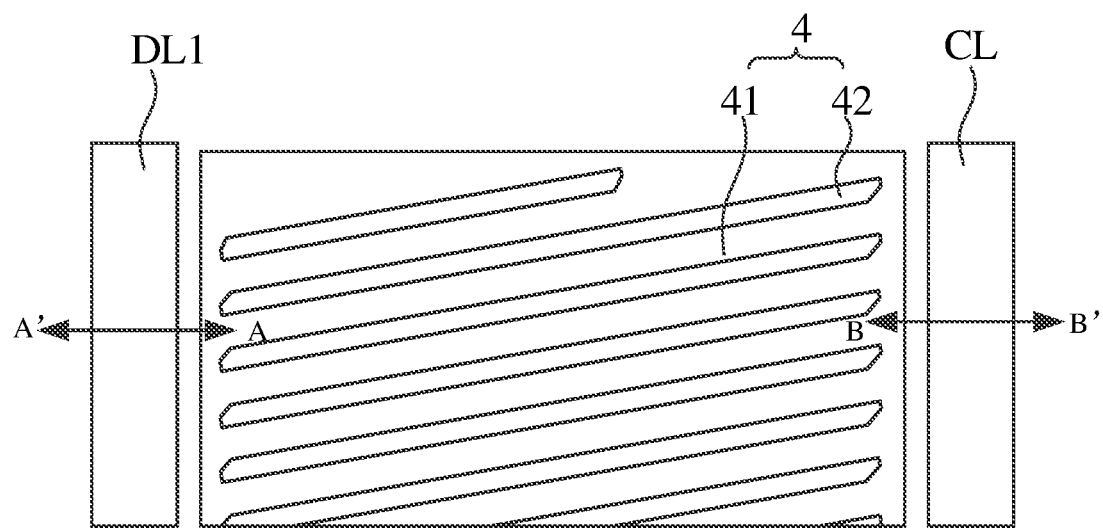
FIG. 2 is an enlarged view of a dotted frame portion of the array substrate shown in FIG. 1.
Figure 3:
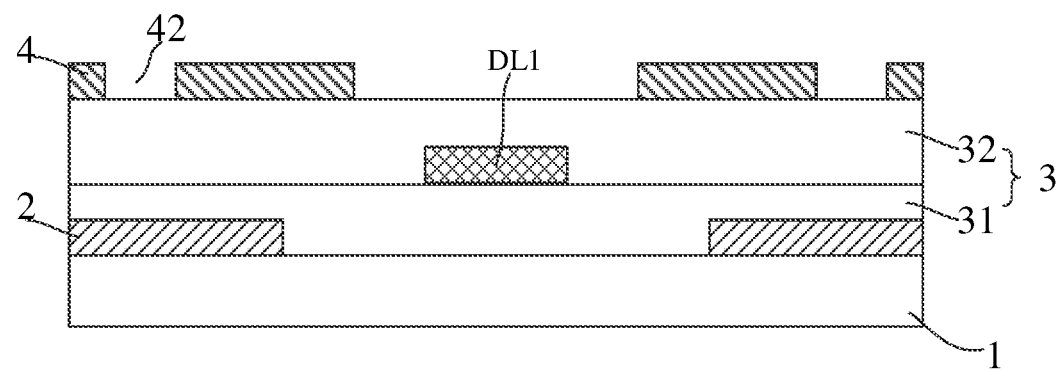
FIG. 3 is a cross-sectional view, which is taken along line AA' in FIG. 2, of the array substrate according to some embodiments of the present disclosure.
Figure 4:
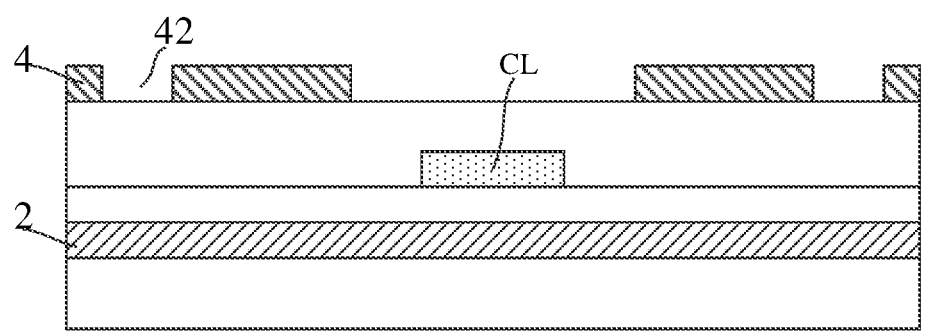
FIG. 4 is a cross-sectional view, which is taken along line BB' in FIG. 2, of the array substrate according to some embodiments of the present disclosure.
Figure 5:
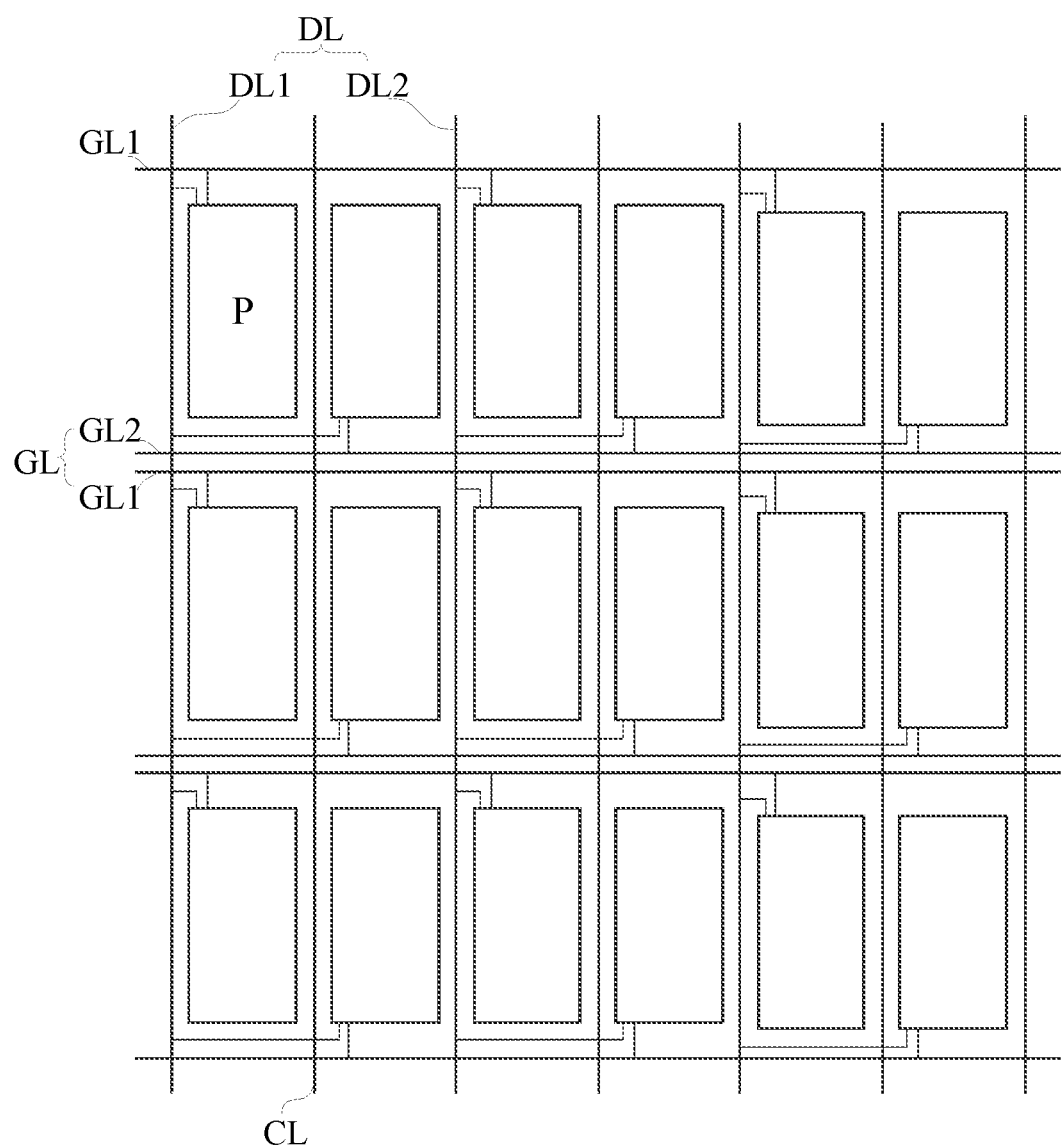
FIG. 5 is a plan view of a pixel arrangement of an array substrate according to some embodiments of the present disclosure.

FIGS. 1-4 are schematic views of an array substrate according to some embodiments of the present disclosure, wherein FIG. 1 is a partial plan view of the array substrate, FIG. 2 is an enlarged view of a dotted frame portion of FIG. 1, and FIG. 3 is a cross-sectional view taken along line AA' in FIG. 2, and FIG. 4 is a cross-sectional view taken along line BB' in FIG. 2. As shown, an array substrate according to some embodiments of the present disclosure may include a base substrate 1 and a plurality of sub-pixels P (as shown in FIG. 5) located on the base substrate 1. The plurality of sub-pixels P are arranged on the base substrate 1 in an array form, that is, there are a plurality of rows of sub-pixels P and a plurality of columns of sub-pixels P. Herein, for convenience of description, a horizontal direction in FIG. 1 is referred to as a row direction, and a vertical direction in FIG. 1 is referred to as a column direction. In FIG. 1, two sub-pixels P adjacent to each other in the row direction are schematically shown. For convenience of description, they may be referred to as a first sub-pixel P1 and a second sub-pixel P2.

Specifically, the array substrate may include a plurality of gate lines GL extending in the row direction, a plurality of data lines DL extending in the column direction, and a plurality of common electrode lines CL extending in the column direction. For example, the plurality of data lines DL and the plurality of common electrode lines CL are alternately arranged in the row direction, and the plurality of data lines DL and the plurality of common electrode lines CL cross respectively the plurality of gate lines GL to define the plurality of sub-pixels P.

Optionally, FIG. 5 shows a plan view of the array substrate shown in FIG. 1, in which more sub-pixels P on the base substrate 1 are schematically shown. As shown in FIG. 5, a dual gate line driving type array substrate is shown. Specifically, two gate lines GL are provided between two adjacent sub-pixels in the column direction. The two gate lines GL may be referred to as a first gate line GL1 and a second gate line GL2, respectively. The first sub-pixel P1 and the second sub-pixel P2 adjacent in the row direction may form a sub-pixel group, and one data line DL is provided between two adjacent sub-pixel groups in the row direction. One common electrode line CL is provided between the two sub-pixels P1, P2 inside the sub-pixel group.

Referring to FIG. 3 and FIG. 4, the array substrate may further include a common electrode 2 and a pixel electrode 4 provided on the base substrate 1. The common electrode 2 cooperates with the pixel electrode 4 to form an electric field that drives liquid crystal molecules to deflect so as to realize a specific grayscale display. Specifically, the array substrate may further include an insulating layer 3 disposed on the base substrate 1 and located between the common electrode 2 and the pixel electrode 4. For example, the common electrodes 2 in all the sub-pixels on the array substrate may be electrically connected to one another, and the pixel electrodes 4 in all the sub-pixels on the array substrate may be independent of each other.

In the embodiments shown in FIGS. 1-5, the common electrode 2, the insulating layer 3, and the pixel electrode 4 are sequentially disposed on the base substrate 1 in a direction distal to the base substrate 1, that is, the common electrode 2 is below the pixel electrode 4. For example, the common electrode 2 is a planar electrode, and the common electrodes 2 in one sub-pixel group may be formed as an integrated planar electrode. As shown, an orthographic projection of a combination of the common electrodes 2 in one sub-pixel group on the base substrate 1 may cover two sub-pixels P1, P2, and the orthographic projection of the combination of the common electrodes 2 in one sub-pixel group on the base substrate 1 may cover an orthographic projection of the common electrode line CL in the sub-pixel group on the base substrate 1. For another example, the pixel electrode 4 is a comb-shaped electrode which has a plurality of slits 42, that is, one pixel electrode 4 may include a plurality of electrode portions 41 and a plurality of slits 42, and the plurality of slits 42 may space the plurality of electrode portions 41 apart from one another, respectively. In the above array substrate, the planar common electrode 2 and the comb-shaped pixel electrode 4 are stacked on the base substrate of the array substrate, an electric field is generated at edges of the comb-shaped pixel electrodes in the same plane and an electric field is generated between a layer where the comb-shaped pixel electrodes are located and a layer where the planar common electrodes are located so as to form a multi-dimensional electric field, so that liquid crystal molecules which are located between the comb-shaped pixel electrodes and directly above the pixel electrodes in a liquid crystal cell and are aligned in all directions are rotatable, thereby achieving display at various grayscales.

For example, each sub-pixel P of the array substrate may further include a thin film transistor located on the base substrate 1. The thin film transistor may include a gate electrode, a source electrode, and a drain electrode, and may further include a gate insulating layer, an active layer, and a passivation layer. For the specific structure of the thin film transistor, reference may be made to the structure of the thin film transistor in the related art, and details are not described herein again.

Optionally, the insulating layer 3 of the array substrate may include a first insulating layer 31 and a second insulating layer 32. For example, the first insulating layer 31 may be formed of the same material as the gate insulating layer of the thin film transistor and be located in the same layer as the gate insulating layer, the second insulating layer 32 may be formed of the same material as the passivation layer of the thin film transistor and be located in the same layer as the passivation layer. The expression "located in the same layer" here refers to layer structures which are formed from a film layer for forming specific patterns by using the same mask through one patterning process, the film layer being formed by using the same film forming process. Depending on the specific patterns, one patterning process may include multiple exposure processes, development processes or etching processes. Also, the specific patterns in the layer structures may be continuous or discontinuous. These specific patterns may also be at different heights or have different thicknesses.

With reference to FIG. 5, among the sub-pixels in the same row, the thin-film transistors of the sub-pixels in odd columns are connected to the same gate line, such as the first gate line GL1, and the thin-film transistors of the sub-pixels in even columns are connected to the same gate line, such as the second gate line GL2. Among the sub-pixels in two adjacent columns, the thin film transistors of the sub-pixels may be connected to the same data line DL. In operation, effective signals may be supplied to the first gate line GL1 and the second gate line GL2 row by row to turn on respective thin film transistors. Specifically, when the thin-film transistors located in odd columns and in a certain row are turned on, a pixel voltage is supplied to the thin-film transistor in one of the odd columns through the data line DL, and the pixel voltage is transmitted to the pixel electrode for display at a corresponding grayscale. When the thin-film transistors located in even columns and in a certain row are turned on, the pixel voltage is supplied to the thin-film transistor in one of the even columns through the data line DL, and the pixel voltage is transmitted to the pixel electrode for display at a corresponding grayscale. In the dual gate line driving manner, the number of gate lines is doubled, and the number of data lines is reduced by half, thereby reducing the cost of a driving IC. Moreover, a charging time is also reduced by half in contrast to that in a single gate line driving manner, thereby improving a charging rate.

Referring back to FIG. 1 and FIG. 2, the slits 42 of the pixel electrode 4 have a lateral slit design, that is, the slits 42 extend substantially in the row direction, or the slits 42 intersect with the data line DL. In this case, in order to generate a fringe electric field that controls a deflection of the liquid crystal molecules, the common electrode 2 needs to completely cover the slits of the pixel electrode 4 on two sides of the sub-pixel P close to the data line DL and the common electrode line CL, as shown in FIG. 3 and FIG. 4. In addition, in consideration of a fluctuation of a manufacturing process, the common electrode 2 needs to extend toward the data line DL or the common electrode line CL in the horizontal direction with respect to respective slits by 2 micrometers or more. As a result, the common electrode 2 and the pixel electrode 4 in one sub-pixel P substantially completely overlap with each other, that is, an orthographic projection of the common electrode 2 on the base substrate and an orthographic projection of the pixel electrode 4 on the base substrate substantially coincide with each other, thereby resulting in a large storage capacitance and further affecting the charging rate adversely.

Figure 6:
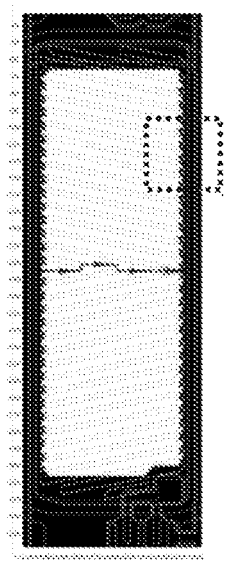
FIG. 6 shows a pixel light effect view of the array substrate shown in FIG. 1 under L255 grayscale.
Figure 7:
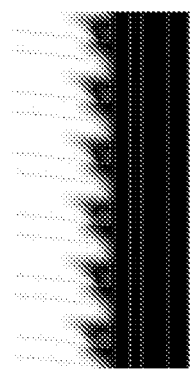
FIG. 7 is a partially enlarged view of a dotted frame portion in FIG. 6.

Further, since the electric fields at corners of the comb-shaped pixel electrode 4 having the slits are disordered, the corners of the comb-shaped pixel electrode 4 may be displayed as dark areas. FIG. 6 shows a pixel light effect view of the array substrate according to the above embodiments under the L255 grayscale, and FIG. 7 is a partially enlarged view of FIG. 6. Since the slits of the pixel electrode 4 have a lateral design, almost all edges of the sub-pixel P in its long-side direction are dark areas, as shown in FIG. 6 and FIG. 7, thereby resulting in a low light efficiency of the sub-pixel.

In order to solve at least one of the above disadvantages, the inventors further proposed an array substrate.

Figure 8:
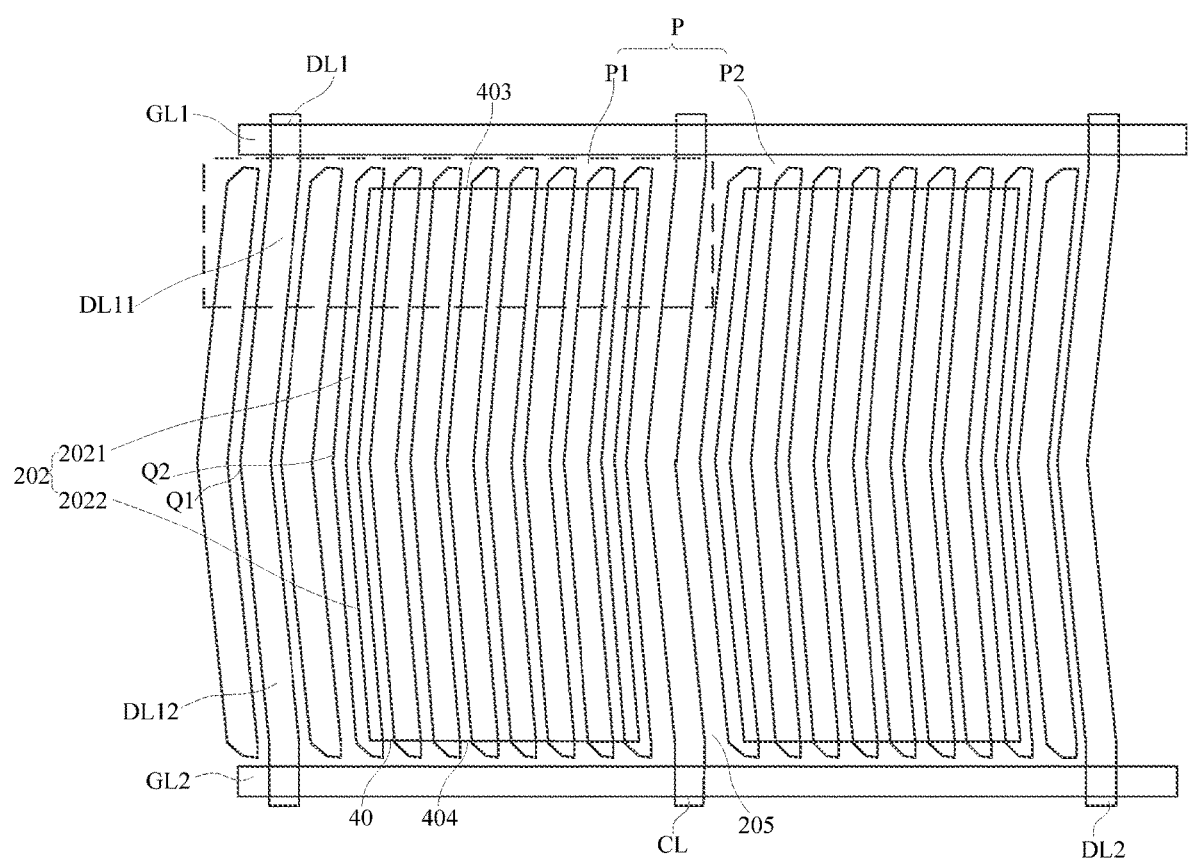
FIG. 8 is a partial plan view of an array substrate according to some other embodiments of the present disclosure.
Figure 9:
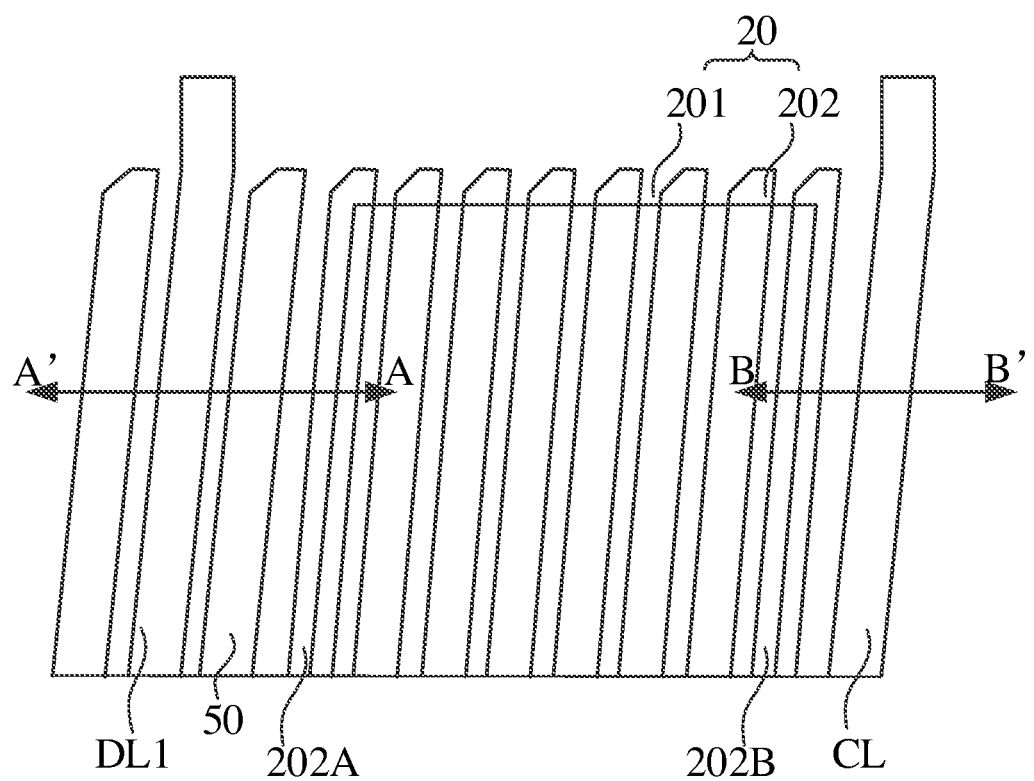
FIG. 9 is an enlarged view of a dotted frame portion of the array substrate shown in FIG. 8.
Figure 10:
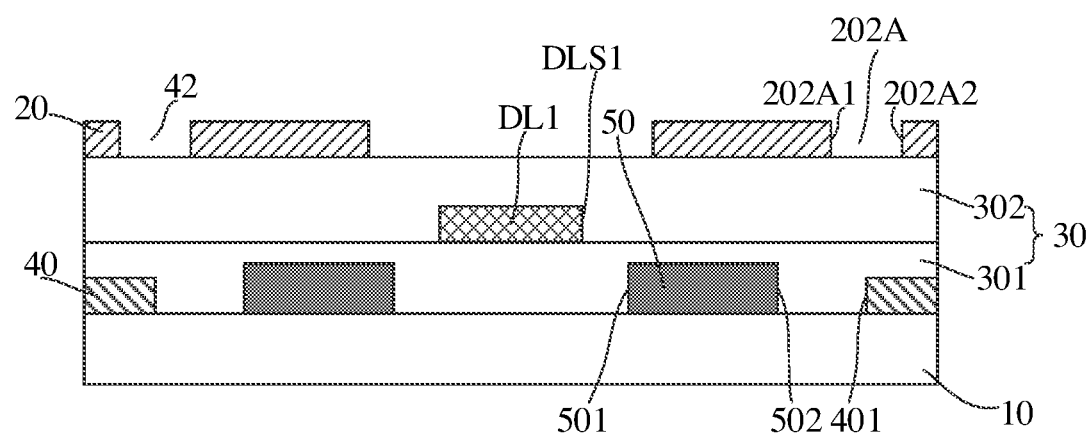
FIG. 10 is a cross-sectional view, which is taken along line AA' in FIG. 9, of the array substrate according to some other embodiments of the present disclosure.
Figure 11:
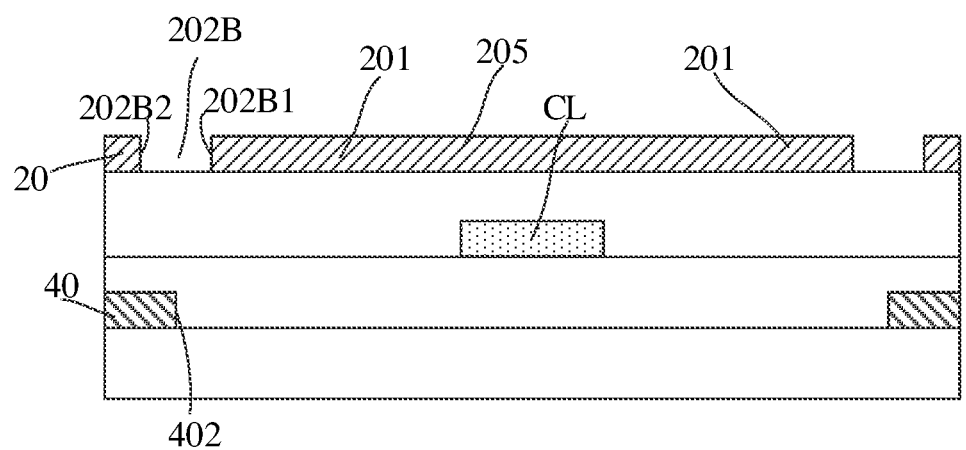
FIG. 11 is a cross-sectional view, which is taken along line BB' in FIG. 9, of the array substrate according to some other embodiments of the present disclosure.
Figure 13:
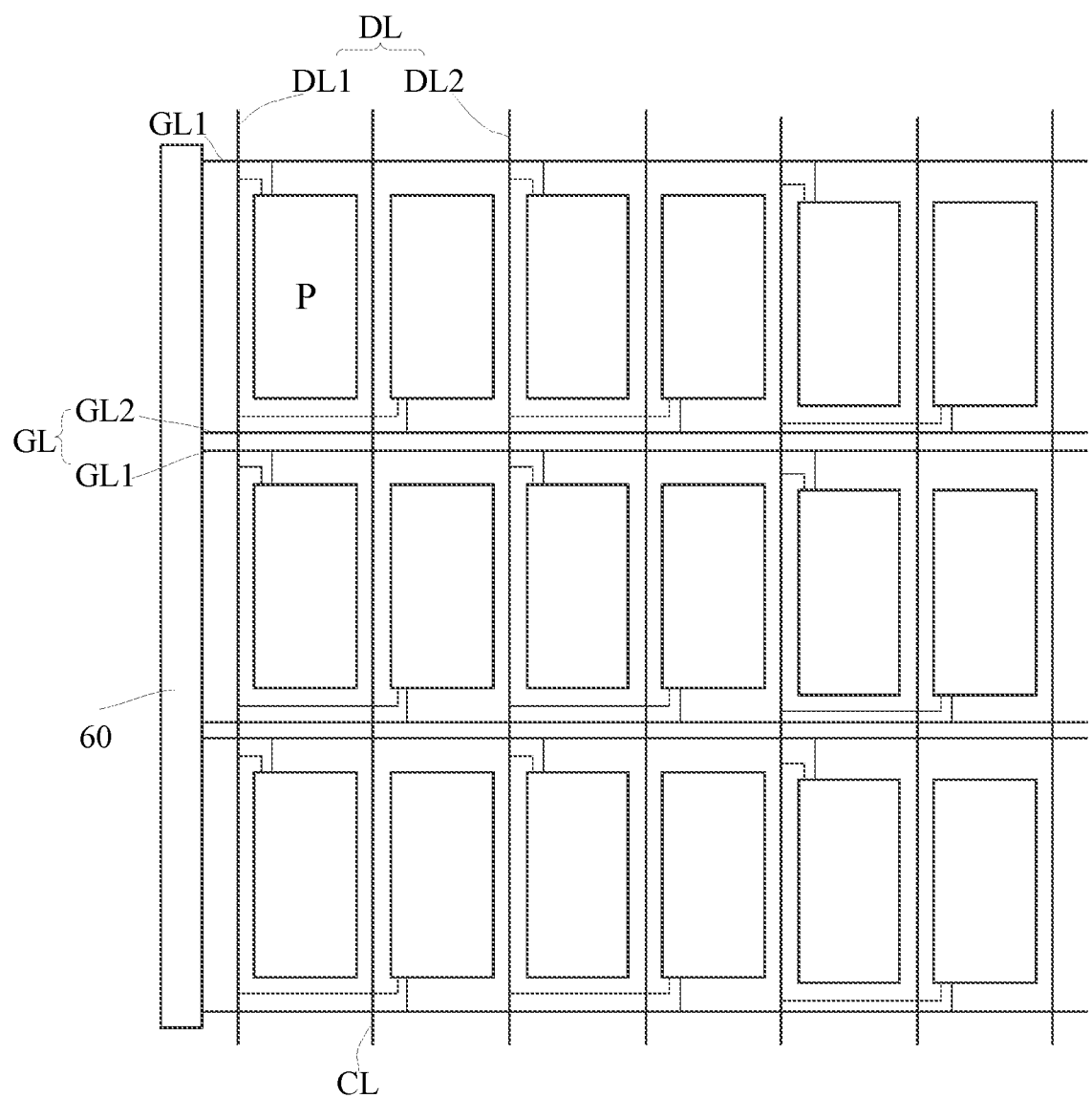
FIG. 13 is a plan view of a pixel arrangement of an array substrate according to some embodiments of the present disclosure.

FIGS. 8-11 are schematic views of an array substrate according to some other embodiments of the present disclosure, wherein FIG. 8 is a partial plan view of the array substrate, FIG. 9 is an enlarged view of a dotted frame portion of FIG. 8, FIG. 10 is a cross-sectional view taken along line AA' in FIG. 9, and FIG. 11 is a cross-sectional view taken along line BB' in FIG. 9. As shown, the array substrate according to some other embodiments of the present disclosure may include a base substrate 10 and a plurality of sub-pixels P (as shown in FIG. 13) located on the base substrate 10. The plurality of sub-pixels P are arranged on the base substrate 10 in an array form, that is, there are a plurality of rows of sub-pixels P and a plurality of columns of sub-pixels P. In FIG. 8, two sub-pixels P adjacent to each other in the row direction are schematically shown. For convenience of description, they may be referred to as a first sub-pixel P1 and a second sub-pixel P2.

Specifically, as shown in FIG. 13, the array substrate may include a plurality of gate lines GL extending in the row direction, a plurality of data lines DL extending in the column direction, and a plurality of common electrode lines CL extending in the column direction. For example, the plurality of data lines DL and the plurality of common electrode lines CL are alternately arranged in the row direction, and the plurality of data lines DL and the plurality of common electrode lines CL cross respectively the plurality of gate lines GL to define the plurality of sub-pixels P.

Two gate lines GL are provided between two adjacent sub-pixels in the column direction. The two gate lines GL may be referred to as a first gate line GL1 and a second gate line GL2, respectively. The first sub-pixel P1 and the second sub-pixel P2 adjacent in the row direction may form a sub-pixel group, and one data line DL is provided between two adjacent sub-pixel groups in the row direction. One common electrode line CL is provided between the two sub-pixels P1, P2 inside the sub-pixel group.

Referring to FIG. 10 and FIG. 11, the array substrate may further include a pixel electrode 40 provided on the base substrate 10; an insulating layer 30 provided on the pixel electrode 40; and a common electrode 20 provided on the insulating layer 30. The common electrode 20 cooperates with the pixel electrode 40 to form an electric field that drives liquid crystal molecules to deflect so as to realize a specific grayscale display.

In the embodiment shown in FIGS. 8 to 11, the pixel electrode 40, the insulating layer 30 and the common electrode 20 are sequentially disposed on the base substrate 10 in a direction distal to the base substrate 10, that is, the pixel electrode 40 is located below the common electrode 20.

For example, the pixel electrode 40 may be a planar electrode, that is, the pixel electrode 40 of one sub-pixel P is a planar electrode.

For example, the common electrode 20 may be a comb-shaped electrode having a plurality of slits 202, that is, a common electrode 20 may include a plurality of electrode portions 201 and a plurality of slits 202, and the plurality of slits 202 may space the plurality of electrode portions 201 apart from one another, respectively. In the array substrate, the comb-shaped common electrode 20 and the planar pixel electrode 40 are stacked on the base substrate of the array substrate, an electric field is generated at edges of the comb-shaped common electrodes in the same plane and an electric field is generated between a layer where the comb-shaped common electrodes are located and a layer where the planar pixel electrodes are located so as to form a multi-dimensional electric field, so that liquid crystal molecules which are located between the comb-shaped common electrodes and directly above the common electrodes in a liquid crystal cell and are aligned in all directions are rotatable, thereby achieving display at various grayscales.

Similarly, each sub-pixel P of the array substrate may further include a thin film transistor located on the base substrate 10. The thin film transistor may include a gate electrode, a source electrode, and a drain electrode, and may further include a gate insulating layer, an active layer, and a passivation layer. For the specific structure of the thin film transistor, reference may be made to the structure of the thin film transistor in the related art, and details are not described herein again.

Optionally, the insulating layer 30 of the array substrate may include a first insulating layer 301 and a second insulating layer 302. For example, the first insulating layer 301 may be formed of the same material as the gate insulating layer of the thin film transistor and be located in the same layer as the gate insulating layer, the second insulating layer 302 may be formed of the same material as the passivation layer of the thin film transistor and be located in the same layer as the passivation layer. The expression "located in the same layer" here refers to layer structures which are formed from a film layer for forming specific patterns by using the same mask through one patterning process, the film layer being formed by using the same film forming process. Depending on the specific patterns, one patterning process may include multiple exposure processes, development processes or etching processes. Also, the specific patterns in the layer structures may be continuous or discontinuous. These specific patterns may also be at different heights or have different thicknesses.

With reference to FIG. 13, among the sub-pixels in the same row, the thin-film transistors of the sub-pixels in odd columns are connected to the same gate line, such as the first gate line GL1, and the thin-film transistors of the sub-pixels in even columns are connected to the same gate line, such as the second gate line GL2. Among the sub-pixels in two adjacent columns, the thin film transistors of the sub-pixels may be connected to the same data line DL. In operation, effective signals may be supplied to the first gate line GL1 and the second gate line GL2 row by row to turn on respective thin film transistors. Specifically, when the thin-film transistors located in odd columns and in a certain row are turned on, a pixel voltage is supplied to the thin-film transistor in one of the odd columns through the data line DL, and the pixel voltage is transmitted to the pixel electrode for display at a corresponding grayscale. When the thin-film transistors located in even columns and in a certain row are turned on, the pixel voltage is supplied to the thin-film transistor in one of the even columns through the data line DL, and the pixel voltage is transmitted to the pixel electrode for display at a corresponding grayscale.

In one example, the slits of the common electrode 20 have a vertical slit design, that is, the slits 202 of the common electrode 20 of one sub-pixel P extend in the same direction as the data line DL of the sub-pixel P. For example, the data line DL of the sub-pixel P extends substantially in the column direction, and the slits 202 of the common electrode 20 of the sub-pixel P also extend substantially in the column direction. That is, the expression "extend in the same direction" here may include a case where the slits 202 of the common electrode 20 of one sub-pixel P is parallel to the data line DL of the sub-pixel P. As another example, as shown in FIG. 8 and FIG. 9, the sub-pixel P having a dual domain structure is shown. In the illustrated dual domain structure, one data line DL includes a first data line portion DL11 and a second data line portion DL12. The first data line portion DL11 and the second data line portion DL2 intersect at a point Q1. One slit 202 includes a first slit portion 2021 and a second slit portion 2022. The first slit portion 2021 and the second slit portion 2022 intersect at a point Q2. The first data line portion DL11 is parallel to the first slit portion 2021, and the second data line portion DL2 is parallel to the second slit portion 2022. The expression "extend in the same direction" here may also include a case where the data lines DL and the slits 202 are arranged as shown in FIG. 8 and FIG. 9.

Figure 12:
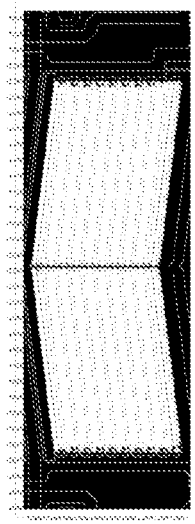
FIG. 12 shows a pixel light effect view of the array substrate shown in FIG. 8 under the L255 grayscale.

FIG. 12 shows a pixel light effect view of the array substrate shown in FIG. 8 to FIG. 11 at the L255 grayscale. Since the slits of the common electrode 20 are vertically designed, only edges of the sub-pixel P in its short-side direction are displayed as dark areas, and edges of the sub-pixel P in its long-side direction are not displayed as dark areas, thereby improving the pixel light efficiency, that is, improving the pixel light transmittance. For example, when an aperture ratio of a pixel is unchanged, the pixel light efficiency of the array substrate using vertically designed slits may be improved by 5 to 8% compared to the array substrate using laterally designed slits.

Referring back to FIG. 8 and FIG. 9, taking the first sub-pixel P1 as an example, the common electrode 20 includes a plurality of electrode portions 201 and a plurality of slits 202. The plurality of slits 202 include a first slit 202A close to the data line DL1 (which may be referred to as a first data line) of the first sub-pixel P1 and a second slit 202B close to the common electrode line CL of the first sub-pixel P1. Accordingly, the pixel electrode 40 of the first sub-pixel P1 may include a first side surface 401 close to the first data line DL and a second side surface 402 close to the common electrode line CL, as shown in FIG. 10 and FIG. 11. For example, an orthographic projection of the first side surface 401 on the base substrate 10 is located within an orthographic projection of the first slit 202A on the base substrate 10. For example, an orthographic projection of the second side surface 402 on the base substrate 10 is located within an orthographic projection of the second slit 202B on the base substrate 10. That is to say, the pixel electrode 40 adopts an indented design. At edge positions of the sub-pixel close to the data line and the common electrode line, the pixel electrode 40 may be indented into the slit of the common electrode 20 at the edge positions, so that an overlapping area between the pixel electrode and the common electrode may be reduced without affecting the deflection of the liquid crystal molecules, thereby reducing a storage capacitance.

Optionally, the orthographic projection of the first side surface 401 on the base substrate 10 may be located at a middle position of the orthographic projection of the first slit 202A on the base substrate 10. Alternatively or additionally, the orthographic projection of the second side surface 402 on the base substrate 10 may be located at a middle position of the orthographic projection of the second slit 202B on the base substrate 10. Simulation results show that, with such a design, the storage capacitance may be reduced by about 30 to 40%, and further the pixel light efficiency may be ensured to reach a good level.

It should be noted that the "middle position" here may be explained as follows. The orthographic projection of the first side surface 401 on the base substrate 10 may be located at the middle position of the orthographic projection of the first slit 202A on the base substrate 10 in a direction (for example, the row direction) perpendicular to the first data line. More specifically, as shown in FIG. 10 and FIG. 11, the first slit 202A may have a first side surface 202A1 and a second side surface 202A2. A distance between the orthographic projection of the first side surface 401 on the base substrate 10 and an orthographic projection of the first side surface 202A1 of the first slit 202A on the base substrate 10 is equal to a distance between the orthographic projection of the first side surface 401 on the base substrate 10 and an orthographic projection of the second side surface 202A2 of the first slit 202A on the base substrate 10. Similarly, the orthographic projection of the second side surface 402 on the base substrate 10 may be located at the middle position of the orthographic projection of the second slit 202B on the base substrate 10 in a direction (for example, the row direction) perpendicular to the common electrode line. More specifically, the second slit 202B may have a first side surface 202B1 and a second side surface 202B2. A distance between the orthographic projection of the second side surface 402 on the base substrate 10 and an orthographic projection of the first side surface 202B1 of the second slit 202B on the base substrate 10 is equal to a distance between the orthographic projection of the second side surface 402 on the base substrate 10 and an orthographic projection of the second side surface 202B2 of the second slit 202B on the base substrate 10.

Optionally, as shown in FIG. 8, the pixel electrode 40 further includes a third side surface 403 close to the first gate line GL1. An orthographic projection of the third side surface 403 of the pixel electrode on the base substrate 10 partially overlaps with orthographic projections of the plurality of slits 202 on the base substrate 10. Additionally and/or alternatively, the pixel electrode 40 further includes a fourth side surface 404 close to the second gate line GL2. An orthographic projection of the fourth side surface 404 of the pixel electrode on the base substrate 10 partially overlaps with the orthographic projections of the plurality of slits 202 on the base substrate 10.

Optionally, the orthographic projection of the common electrode 20 on the base substrate 10 may at least partially overlap with the orthographic projection of the common electrode line GL on the base substrate 10. As shown in FIG. 8, the first sub-pixel P1 of the array substrate is defined by the first gate line GL1, the second gate line GL2, the common electrode line CL and the first data line DL1, and the second sub-pixel P2 of the array substrate is defined by the first The gate line GL1, the second gate line GL2, the common electrode line CL and the second data line DL2. The first sub-pixel P1 and the second sub-pixel P2 are two sub-pixels which are adjacent in the row direction. The first data line DL1 and the second data line DL2 are located on two sides of the common electrode line CL, respectively. The common electrode 20 of the first sub-pixel P1 is electrically connected with the common electrode 20 of the second sub-pixel P2. A connection portion between the common electrode 20 of the first sub-pixel P1 and the common electrode 20 of the second sub-pixel P2 is indicated by a reference numeral 205 as shown in FIG. 8. For example, the common electrode 20 of the first sub-pixel P1 and the common electrode 20 of the second sub-pixel P2 may be an integrated common electrode. In this way, the connection portion 205 between the common electrode 20 of the first sub-pixel P1 and the common electrode 20 of the second sub-pixel P2 is a part of the integrated common electrode. Specifically, as shown in FIG. 11, both the electrode portion 201 of the common electrode 20 of the first sub-pixel P1 close to the common electrode line CL and the electrode portion 201 of the common electrode 20 of the second sub-pixel P2 close to the common electrode line CL are formed as the connection portion 205. An orthographic projection of the connection portion 205 on the base substrate 10 at least partially overlaps with the orthographic projection of the common electrode line CL on the base substrate 10. A dimension (which is illustrated as a height in FIG. 8) of the connection portion 205 in the extending direction of the common electrode line CL is equal to a dimension (which is illustrated as a height in FIG. 8) of any one of the common electrode 20 of the sub-pixel (for example, P1) on one side of the common electrode line CL and the common electrode 20 of the sub-pixel (for example, P2) on the other side of the common electrode line CL in the extending direction of the common electrode line CL. For example, in the pixel region, the orthographic projection of the connection portion 205 on the base substrate 10 substantially covers the orthographic projection of the common electrode line CL on the base substrate 10. In operation, there is no voltage difference between the common electrode 20 and the common electrode line CL. The common electrode 20 located above the common electrode line CL covers the common electrode line CL. In this way, a load on the common electrode line CL is not increased, and an electric field generated by the common electrode line CL may be shielded, thereby avoiding light leakage at the common electrode line.

As shown in FIG. 10, the orthographic projection of the first data line DL1 of the first sub-pixel P1 on the base substrate 10 does not overlap with the orthographic projection of the common electrode 20 of the first sub-pixel P1 on the base substrate 10. If the orthographic projection of the first data line DL1 of the first sub-pixel P1 on the base substrate 10 partially or completely overlaps with the orthographic projection of the common electrode 20 of the first sub-pixel P1 on the base substrate 10, a load on the first data line may be increased, which is not conducive to charging the first sub-pixel.

As shown in FIG. 10, the orthographic projection of the first data line DL1 of the first sub-pixel P1 on the base substrate 10 does not overlap with the orthographic projection of the pixel electrode 40 of the first sub-pixel P1 on the base substrate 10. For example, the first sub-pixel P1 of the array substrate may further include a light shielding portion 50, and the light shielding portion 50 may be located in the same layer as the pixel electrode 40. The expression "located in the same layer" here means that the light shielding portion 50 and the pixel electrode 40 are physically located in the same layer. For example, as shown in FIG. 10, they may be formed directly on the base substrate 10. It should be understood that the light shielding portion 50 and the pixel electrode 40 may be formed of different materials. For example, the light shielding portion 50 is formed of opaque materials such as metal, and the pixel electrode 40 is formed of light-transmitting materials such as ITO. An orthographic projection of the light shielding portion 50 on the base substrate 10 may be located between the orthographic projection of the first data line DL1 on the base substrate 10 and the orthographic projection of the pixel electrode 40 of the first sub-pixel P1 on the base substrate 10. By providing the light shielding portion 50, light leakage at the first data line DL1 may be shielded.

Optionally, the light shielding portion 50 is disposed closer to the first data line DL1. For example, the light shielding portion 50 may include a first side surface 501 close to the first data line DL1 and a second side surface 502 distal to the first data line DL1. The first data line DL1 may include a first side surface DLS1 close to the light shielding portion 50. The pixel electrode 40 may include the first side surface 401 close to the light shielding portion 50. A distance between an orthographic projection of the first side surface 501 of the light shielding portion 50 on the base substrate 10 and an orthographic projection of the first side surface DLS1 of the first data line DL1 on the base substrate 10 is smaller than a distance between an orthographic projection of the second side surface 502 of the light shielding portion 50 on the base substrate 10 and the orthographic projection of the first side surface 401 of the pixel electrode 40 on the base substrate 10. For example, the distance between the orthographic projection of the first side surface 501 of the light shielding portion 50 on the base substrate 10 and the orthographic projection of the first side surface DLS1 of the first data line DL1 on the base substrate 10 may be relatively small. Optionally, the orthographic projection of the first side surface 501 of the light shielding portion 50 on the base substrate 10 may coincide with the orthographic projection of the first side surface DLS1 of the first data line DL1 on the base substrate 10, that is, the distance between the orthographic projection of the first side surface 501 of the light shielding portion 50 on the base substrate 10 and the orthographic projection of the first side surface DLS1 of the first data line DL1 on the base substrate 10 may be close to zero, or equal to zero.

Since a lateral electric field between the first data line and the pixel electrode may result in the pixel light leakage at the first data line, it is necessary to utilize a black matrix on a color filter substrate to shield the light leakage area. Considering an aligned deviation between the array substrate and the color filter substrate, it is necessary to make a wide black matrix. In the above array substrate, by providing the light shielding portion, the light leakage at the first data line may be shielded.

As shown in FIG. 13, the array substrate according to some embodiments of the present disclosure may further include a gate driving circuit 60 provided on the base substrate 10 to supply scanning signals to the gate lines GL. That is, a GOA driving form is used in the array substrate. Thus, external circuits only need to supply a few control signals, thereby reducing the manufacturing cost.

Figure 14:
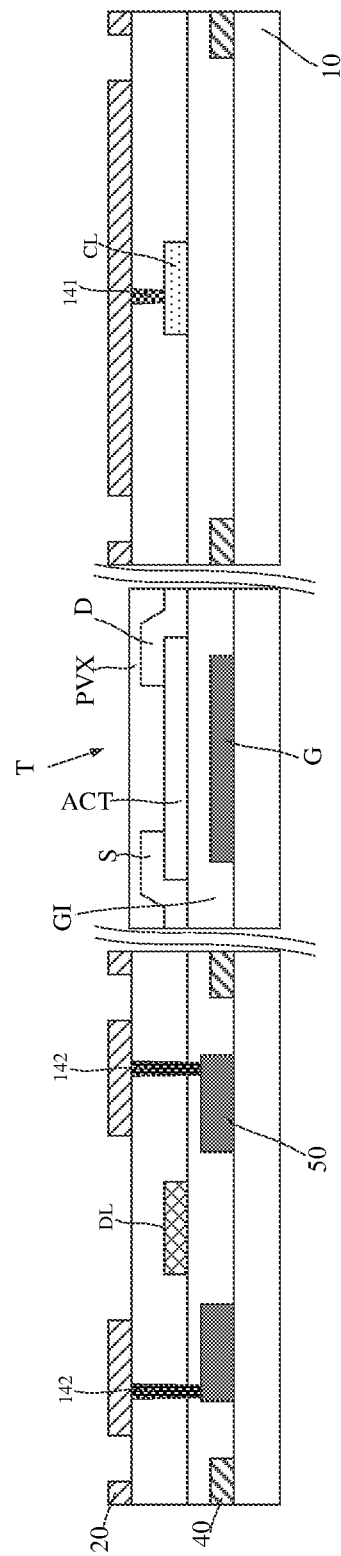
FIG. 14 is a cross-sectional view of an array substrate according to some embodiments of the present disclosure, in which a thin film transistor is shown.

As shown in FIG. 14, the thin film transistor and the pixel electrode/the common electrode of the array substrate according to some embodiments of the present disclosure are schematically shown. The thin film transistor T may include a gate electrode G, a source electrode S, and a drain electrode D, and may further include a gate insulating layer GI, an active layer ACT and a passivation layer PVX. Alternatively, the data lines DL and the common electrode lines CL may be formed of the same material as the source electrode S or the drain electrode D, and formed through the same patterning process as the source electrode S or the drain electrode D. Optionally, the light shielding portion 50 may be located in the same layer as the gate electrode G. The expression "located in the same layer" here means that two layers are formed of the same material and formed through the same patterning process, that is, the light shielding portion 50 may be formed of the same material as the gate electrode G and formed through the same patterning process as the gate electrode 50.

For example, the common electrode 20 and the pixel electrode 40 may be formed of light-transmitting materials, such as indium tin oxide (ITO) or indium zinc oxide (IZO). The data lines DL, the common electrode lines CL and the light shielding portion 50 may be formed of opaque materials such as a metal.

For example, the data line DL and the common electrode line CL are located in the same layer and spaced apart from one another, and the common electrode line CL is electrically connected to the common electrode 20 through a first conductive plug 141.

For example, the light shielding portion 50 is electrically connected to the common electrode 20 through a second conductive plug 142. With such a design, an electric coupling on the light shielding portion due to an influence of surrounding electric fields may be avoided, thereby avoiding adverse effects caused by the electric coupling on the light shielding portion.

Herein, the expression "conductive plug" generally refers to a conductive material portion which is filled into a via hole formed in an insulating material layer and is used to electrically connect two portions located in different layers.

Figure 15A:
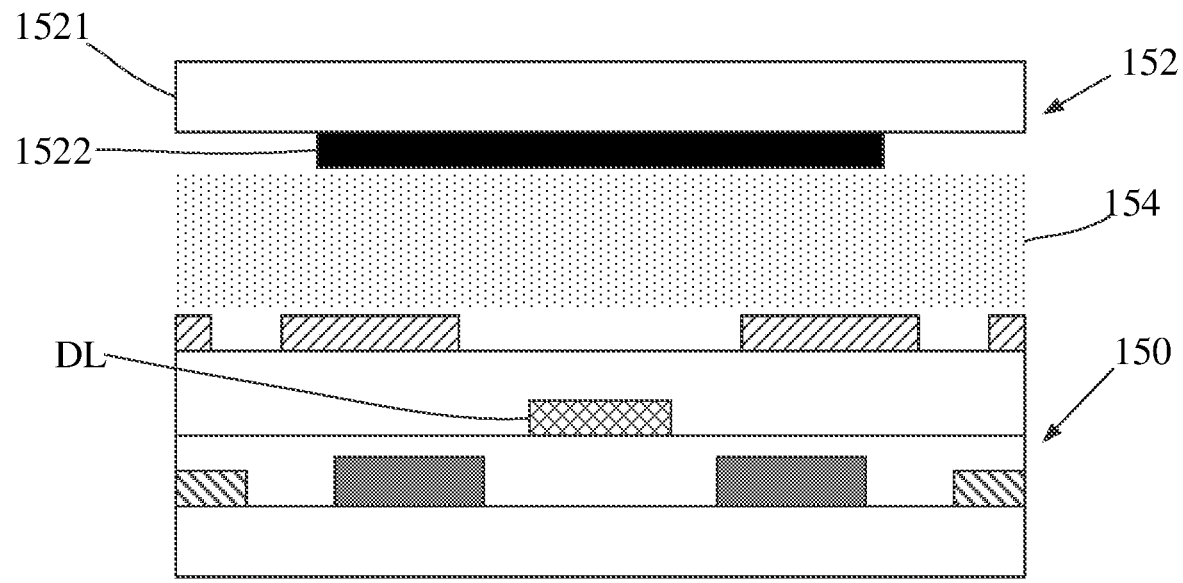
FIG. 15A and FIG. 15B are cross-sectional views of a display panel according to some embodiments of the present disclosure, respectively.
Figure 15B:
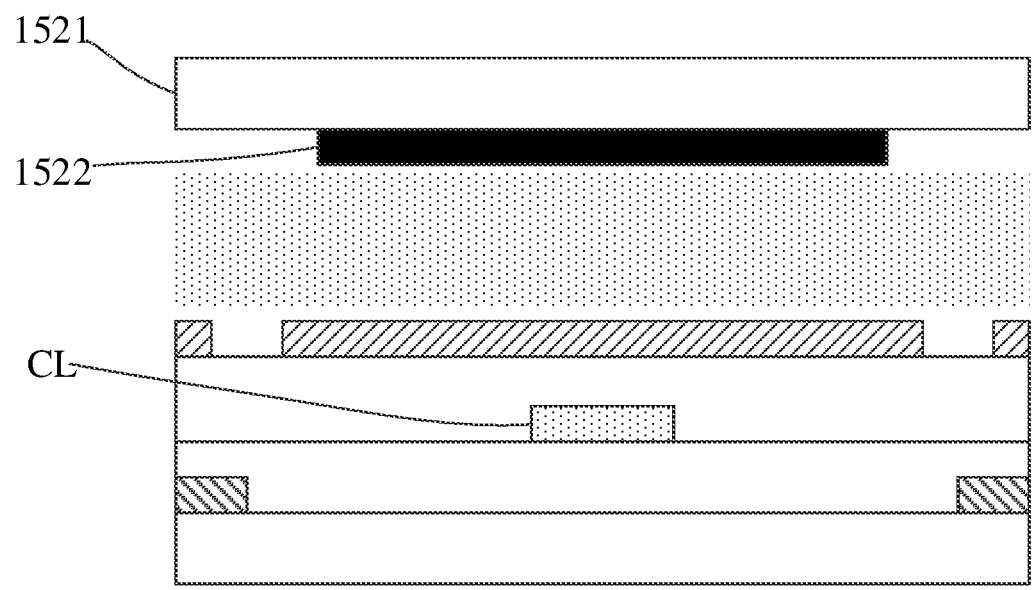

FIG. 15A and FIG. 15B are schematic views of a display panel according to some embodiments of the present disclosure. The display panel may include an array substrate 150 and an opposite substrate 152 disposed opposite to the array substrate 150. The display panel may further include a liquid crystal layer 154 between the array substrate 150 and the opposite substrate 152. The array substrate 150 may be the above-mentioned array substrate, that is, both the pixel electrode and the common electrode are disposed on the array substrate.

For example, the opposite substrate 152 may be a color filter substrate. Specifically, it may include a base substrate 1521 and a black matrix 1522 located on the base substrate 1521. As shown in FIG. 15A, an orthographic projection of the black matrix 1522 on the base substrate 10 covers the orthographic projection of the data line DL on the base substrate 10. As shown in FIG. 15B, the orthographic projection of the black matrix 1522 on the base substrate 10 covers the orthographic projection of the common electrode line CL on the base substrate 10.

Figure 16:
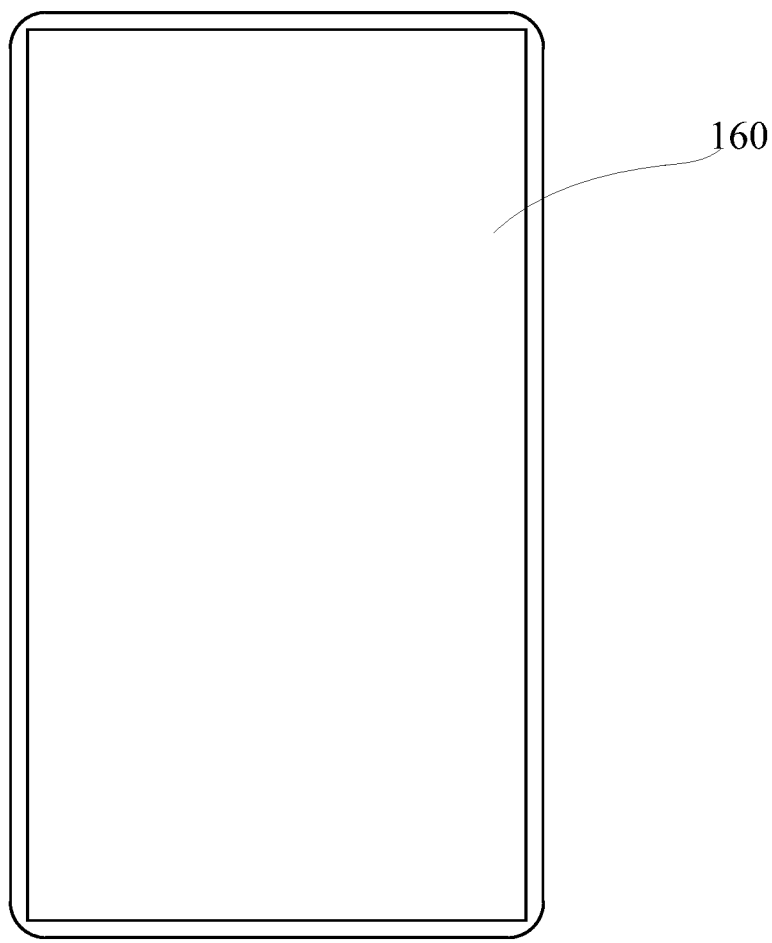
FIG. 16 is a schematic view of a display device according to some embodiments of the present disclosure.

According to some embodiments of the present disclosure, a display device is also provided, as shown in FIG. 16, which illustrates a plan view of a display device according to some embodiments of the present disclosure. The display device 160 may include the display panel described in any one of the above embodiments. For example, the display device may be any product or component with a display function, such as a smart phone, a wearable smart watch, smart glasses, a tablet computer, a television, a display, a notebook computer, a digital photo frame, a navigator, a car display, and an e-book.

By means of the array substrate, the display panel and the display device as described above, dark areas in a sub-pixel may be reduced, thereby improving the pixel light transmittance.

Figure 17:
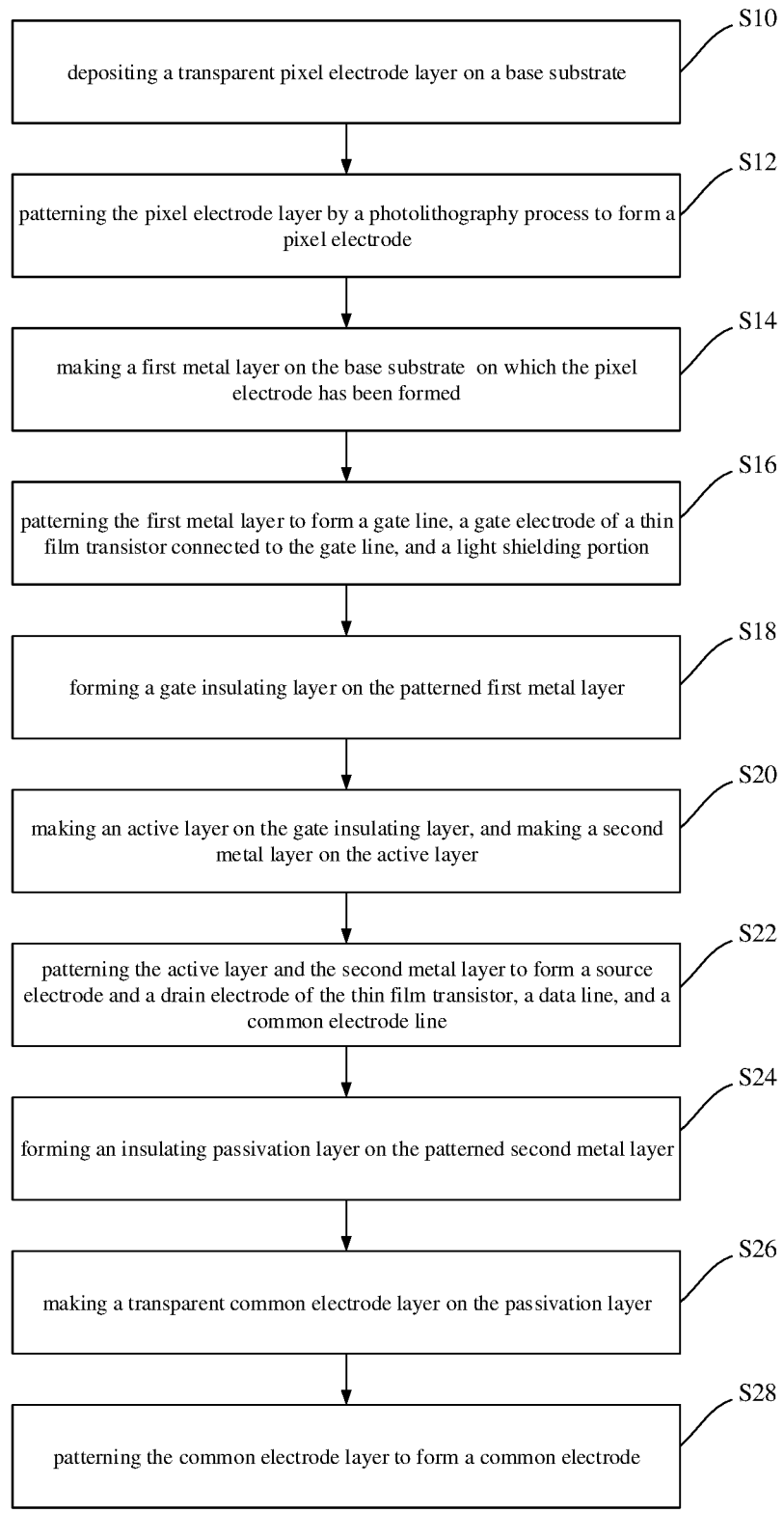
FIG. 17 is a flowchart of a method of manufacturing an array substrate according to some embodiments of the present disclosure.

FIG. 17 is a flowchart of a method of manufacturing an array substrate according to some embodiments of the present disclosure. As shown, a method of manufacturing an array substrate according to some embodiments of the present disclosure may include the following steps.

In step S10, a transparent pixel electrode layer is deposited on a base substrate, for example, by a sputtering method. A material of the pixel electrode layer may be, for example, ITO or IZO.

In step S12, the pixel electrode layer is patterned by a photolithography process, such as exposure, development, and etching, for example, by using a mask, to form a pixel electrode as shown in FIGS. 8-11. A part of the pixel electrodes 40 are shown in FIGS. 8-11, but those skilled in the art may understand that the pixel electrodes shown in the drawings may be arranged in the row direction and in the column direction.

In step S14, a first metal layer is made on the base substrate, on which the pixel electrode has been formed, by a process such as evaporation or magnetron sputtering, and its material is, for example, Mo, Cu, Cr, Al, Ag, or the like.

In step S16, the first metal layer is patterned by a photolithography process, such as exposure, development, and etching, for example, by using a mask, to form a gate line, a gate electrode of a thin film transistor connected to the gate line, and a light shielding portion 50 (as shown in FIG. 10).

In step S18, a gate insulating layer is formed on the patterned first metal layer, for example, by a chemical vapor deposition (CVD) method, and its material is, for example, silicon nitride or silicon oxide.

In step S20, an active layer is made on the gate insulating layer, for example, by a chemical vapor deposition method, and a second metal layer is made on the active layer by a method such as magnetron sputtering. The material of the active layer is, for example, polysilicon, low-temperature polysilicon, and the like, and the material of the second metal layer is, for example, Mo, Al, Cu, Ag, or the like.

In step S22, for example, the active layer and the second metal layer are patterned by a photolithography process, for example, by using a mask, to form a source electrode and a drain electrode of the thin film transistor, a data line, and a common electrode line.

In step S24, an insulating passivation layer is formed on the patterned second metal layer, for example, by a chemical vapor deposition method, and its material is, for example, silicon oxide, silicon nitride, or the like.

In step S26, a transparent common electrode layer is made on the passivation layer by a process such as evaporation or magnetron sputtering, and its material is, for example, ITO, IZO, or other transparent oxides.

In step S28, the common electrode layer is patterned by a photolithography process, for example, by using a mask, to form a common electrode 20.

In the method of manufacturing the array substrate according to the embodiments of the present disclosure, a manufacturing process of the ADS array substrate is not changed, and the number of patterning processes is not increased, so that manufacturing cost may be saved.

It should be noted that, when the array substrate includes a GOA circuit, the GOA circuit may be formed by using the same process as the thin film transistor, thereby further saving manufacturing cost.

It should be noted that, in the illustrated embodiments, it is mainly shown that the sub-pixel includes a dual domain structure. However, the embodiments of the present disclosure are not limited to the dual domain structure. In other embodiments, the sub-pixel may have a single domain structure or multi-domain structure in which there are more than two domains.

Although some embodiments according to a general inventive concept of the present disclosure have been illustrated and described, those skilled in the art will understand that changes may be made to these embodiments without departing from the principle and spirit of the present general inventive concept. The scope of the present disclosure shall be defined by the claims and their equivalents.

What is claimed is:

1. An array substrate, comprising:
   a base substrate;
   a data line and a common electrode line on the base substrate; and
   a first gate line and a second gate line on the base substrate, both the first gate line and the second gate line being insulated from and crossing both the data line and the common electrode line to define a sub-pixel,
   wherein the sub-pixel comprises:
      a pixel electrode on the base substrate;
      a common electrode on a side of the pixel electrode distal to the base substrate; and
      an insulating layer between the pixel electrode and the common electrode,
   wherein the common electrode comprises a plurality of slits, and the plurality of slits extend in the same direction as the data line, and
   wherein the plurality of slits comprise a first slit close to the data line, the pixel electrode comprises a first side surface close to the data line, and an orthographic projection of the first side surface of the pixel electrode on the base substrate is located within an orthographic projection of the first slit on the base substrate;
   wherein the plurality of slits comprise a second slit close to the common electrode line, the pixel electrode comprises a second side surface close to the common electrode line, and an orthographic projection of the second side surface of the pixel electrode on the base substrate is located within an orthographic projection of the second slit on the base substrate;
   wherein the common electrode line and the common electrode are located in different layers, and the common electrode line is located between the pixel electrode and the common electrode;
   wherein the sub-pixel further comprises a light shielding portion, and an orthographic projection of the light shielding portion on the base substrate is located between an orthographic projection of the data line on the base substrate and an orthographic projection of the pixel electrode on the base substrate, wherein the light shielding portion and the pixel electrode are located in the same layer, and the data line and the common electrode line are located in the same layer; and
   wherein a distance between the first slit and the data line is larger than a distance between the second slit and the common electrode line, and a distance between the first side surface of the pixel electrode and the data line is larger than a distance between the second side surface of the pixel electrode and the common electrode line.

2. The array substrate according to claim 1, wherein the orthographic projection of the first side surface of the pixel electrode on the base substrate is located at a middle position of the orthographic projection of the first slit on the base substrate in a direction perpendicular to the data line; and
   the orthographic projection of the second side surface of the pixel electrode on the base substrate is located at a middle position of the orthographic projection of the second slit on the base substrate in a direction perpendicular to the common electrode line.

3. The array substrate according to claim 2, wherein the pixel electrode comprises a third side surface close to the first gate line, and an orthographic projection of the third side surface of the pixel electrode on the base substrate partially overlaps with orthographic projections of the plurality of slits on the base substrate; and
   the pixel electrode comprises a fourth side surface close to the second gate line, and an orthographic projection of the fourth side surface of the pixel electrode on the base substrate partially overlaps with the orthographic projections of the plurality of slits on the base substrate.

4. The array substrate according to claim 1, wherein an orthographic projection of the common electrode on the base substrate at least partially overlaps with an orthographic projection of the common electrode line on the base substrate.

5. The array substrate according to claim 4, wherein the array substrate comprises a plurality of the sub-pixels, and the plurality of the sub-pixels comprise at least two sub-pixels which are located in the same row and on two sides of the common electrode line respectively; and
   wherein an orthographic projection of any one common electrode of the two sub-pixels on the base substrate at least partially overlaps with the orthographic projection of the common electrode line on the base substrate.

6. The array substrate according to claim 5, wherein the array substrate further comprises a connection portion for connecting the common electrodes of the two sub-pixels, an orthographic projection of the connection portion on the base substrate at least partially overlaps with the orthographic projection of the common electrode line on the base substrate, and a size of the connection portion in an extension direction of the common electrode line is equal to a size of any one of the common electrodes of the two sub-pixels in the extension direction of the common electrode line.

7. The array substrate according to claim 1, wherein the light shielding portion comprises a first side surface close to the data line and a second side surface distal to the data line, the data line comprises a first side surface close to the light shielding portion, and a distance between an orthographic projection of the first side surface of the light shielding portion on the base substrate and an orthographic projection of the first side surface of the data line on the base substrate is smaller than a distance between an orthographic projection of the second side surface of the light shielding portion on the base substrate and the orthographic projection of the first side surface of the pixel electrode on the base substrate.

8. The array substrate according to claim 7, wherein the orthographic projection of the first side surface of the light shielding portion on the base substrate coincides with the orthographic projection of the first side surface of the data line on the base substrate.

9. The array substrate according to claim 1, wherein the orthographic projection of the data line on the base substrate does not overlap with an orthographic projection of the common electrode on the base substrate.

10. The array substrate according to claim 1, further comprising a thin film transistor comprising a gate electrode, wherein the light shielding portion and the gate electrode of the thin film transistor are located in the same layer.

11. The array substrate according to claim 1, wherein the data line comprises a first data line portion and a second data line portion, and the first data line portion intersects with the second data line portion;
one of the slits comprises a first slit portion and a second slit portion, and the first slit portion intersects with the second slit portion; and
the first data line portion is parallel to the first slit portion, and the second data line portion is parallel to the second slit portion.

12. The array substrate according to claim 1, wherein the array substrate comprises a plurality of the sub-pixels; and
wherein, among ones of the plurality of the sub-pixels in the same row, the sub-pixels in odd columns are connected to the first gate line, and the sub-pixels in even columns are connected to the second gate line.

13. The array substrate according to claim 1, wherein the pixel electrode is a planar electrode.

14. The array substrate according to claim 1, wherein the data line and the common electrode line are located in the same layer and spaced apart from each other, and the common electrode line is electrically connected to the common electrode through a first conductive plug.

15. The array substrate according to claim 1, wherein the light shielding portion is electrically connected to the common electrode through a second conductive plug.

16. An array substrate, comprising:
a base substrate;
a data line and a common electrode line on the base substrate; and
a first gate line and a second gate line on the base substrate, both the first gate line and the second gate line crossing both the data line and the common electrode line to define a sub-pixel,
wherein the sub-pixel comprises:
a pixel electrode on the base substrate;
a common electrode on a side of the pixel electrode distal to the base substrate; and
an insulating layer between the pixel electrode and the common electrode,
wherein the common electrode comprises a plurality of slits, and the plurality of slits extend in the same direction as the data line, and
wherein the plurality of slits comprise a second slit close to the common electrode line, the pixel electrode comprises a second side surface close to the common electrode line, and an orthographic projection of the second side surface of the pixel electrode on the base substrate is located within an orthographic projection of the second slit on the base substrate; and
wherein the common electrode line and the common electrode are located in different layers, and the common electrode line is located between the pixel electrode and the common electrode;
wherein the sub-pixel further comprises a light shielding portion, and an orthographic projection of the light shielding portion on the base substrate is located between an orthographic projection of the data line on the base substrate and an orthographic projection of the pixel electrode on the base substrate, wherein the light shielding portion and the pixel electrode are located in the same layer, and the data line and the common electrode line are located in the same layer; and
wherein a distance between the first slit and the data line is larger than a distance between the second slit and the common electrode line, and a distance between the first side surface of the pixel electrode and the data line is larger than a distance between the second side surface of the pixel electrode and the common electrode line.

17. The array substrate according to claim 1, wherein the orthographic projection of the first side surface of the pixel electrode on the base substrate is located at a middle position of the orthographic projection of the first slit on the base substrate in a direction perpendicular to the data line; or
the orthographic projection of the second side surface of the pixel electrode on the base substrate is located at a middle position of the orthographic projection of the second slit on the base substrate in a direction perpendicular to the common electrode.

18. The array substrate according to claim 2, wherein the pixel electrode comprises a third side surface close to the first gate line, and an orthographic projection of the third side surface of the pixel electrode on the base substrate partially overlaps with orthographic projections of the plurality of slits on the base substrate; or
the pixel electrode comprises a fourth side surface close to the second gate line, and an orthographic projection of the fourth side surface of the pixel electrode on the base substrate partially overlaps with the orthographic projections of the plurality of slits on the base substrate.

* * * * *